(12) United States Patent
Heikenfeld et al.

(10) Patent No.: US 7,898,740 B2
(45) Date of Patent: Mar. 1, 2011

(54) TUNABLE OPTICAL ARRAY DEVICE COMPRISING LIQUID CELLS

(75) Inventors: Jason Heikenfeld, New Richmond, OH (US); Joachim Bradl, Schriessheim (DE)

(73) Assignees: SeeReal Technologies S.A., Luxembourg (LU); The University of Cincinnati, Cincinnati, OH (US)

( * ) Notice: Subject to any disclaimer, the term of this patent is extended or adjusted under 35 U.S.C. 154(b) by 229 days.

(21) Appl. No.: 12/100,032

(22) Filed: Apr. 9, 2008

(65) Prior Publication Data

US 2009/0257111 A1    Oct. 15, 2009

(51) Int. Cl.
  *G02B 1/06*    (2006.01)
  *G02B 3/12*    (2006.01)
(52) U.S. Cl. ..................... 359/665; 359/666
(58) Field of Classification Search .............. 359/665, 359/666
  See application file for complete search history.

(56) References Cited

U.S. PATENT DOCUMENTS

| | | |
|---|---|---|
| 5,648,859 A | 7/1997 | Hirabayashi et al. |
| 7,324,287 B1 | 1/2008 | Gollier |
| 2006/0079728 A1 | 4/2006 | Kuiper et al. |
| 2007/0133079 A1 | 6/2007 | Cernasov |
| 2008/0088551 A1 | 4/2008 | Cernasov |
| 2008/0088940 A1* | 4/2008 | Li et al. ............ 359/666 |

FOREIGN PATENT DOCUMENTS

| | | |
|---|---|---|
| DE | 10 2007 024 237 A1 | 11/2008 |
| DE | 10 2008 000 438 A1 | 9/2009 |
| EP | 1 542 055 A2 | 6/2005 |
| EP | 1 986 023 A1 | 10/2008 |
| WO | 2004/051323 A1 | 6/2004 |
| WO | 2005/006029 A1 | 1/2005 |
| WO | 2007/069099 A2 | 6/2007 |
| WO | 2007/094259 A1 | 8/2007 |

OTHER PUBLICATIONS

Hou et al., "Electrowetting Micro-prisms and Micro-mirrors," Lasers and Electro-Optics Society, The 20th Annual Meeting of the IEEE pp. 457-458 (Oct. 1, 2007).
L. Hou, N. Smith, and J. Heikenfeld, Electrowetting Modulation of Any Flat Optical Film, Appl. Phys. Lett., vol. 90, 251114, 2007.
J. Heikenfeld, N. Smith, D. Abeysinghe, A. J. Steckl, and J. W. Haus, Flat Electrowetting Optics, IEEE LEOS Newsletter, vol. 20 (4), pp. 4-10, Aug. 2006.
B. Sun, K. Zhou, Y. Lao, W. Cheng, and J. Heikenfeld, Scalable Fabrication of Electrowetting Pixel Arrays with Self-Assembled Oil Dosing, Appl. Phys. Lett., vol. 91, 011106, 2007.
International Search Report, dated Oct. 1, 2009, and Written Opinion issued in corresponding International Application No. PCT/EP2009/054146.

* cited by examiner

*Primary Examiner* — William C Choi
(74) *Attorney, Agent, or Firm* — Saul Ewing LLP (57) ABSTRACT

A tunable optical component includes comprises a plurality of individual tunable liquid cells regularly arranged and integrated to at least one cell structure forming an array on the supporting substrate. A single liquid cell comprises several integrated cell walls, the cell walls projecting away from the supporting substrate and having a closed base area and an open cell surface at the cell wall edges. The liquid cell is filled with at least two liquids or fluids to provide at least one tunable interface area for varying the optical characteristic of the liquid cell.

28 Claims, 6 Drawing Sheets

TUNABLE OPTICAL ARRAY DEVICE COMPRISING LIQUID CELLS

FIELD OF THE INVENTION

The present invention relates to a tunable optical array device comprising liquid cells. Each liquid cell contains at least two different fluids or liquids separated by at least one interface area that is tunable by steering electrodes using the principle of electro wetting. The liquid cells of the optical array device provide variable prism functions by moving the position and/or the tilt angle of the interface areas between the adjacent fluids in two dimensions.

Further, the present invention relates to creating the tunable optical array device, materials and geometries required, and a method for manufacturing a tunable optical array device by a method for creating deep three-dimensional microstructures.

TECHNICAL BACKGROUND

Optical elements having tunable optical characteristics by using the known electro wetting effect have been a highly attractive modulation scheme for a variety of optical applications. A large number of devices based on electro wetting tuning have been devised: For example, electro wetting has been used as an optical switch for fiber optics, as an optical shutter or filter for camera and guidance systems, in optical pickup devices, in video display devices, and in optical waveguide materials.

In the present document the term 'liquid cell' describes a single optical element for tuning the propagation of a bundle of light beams. The liquid cell includes a chamber having cell walls filled with at least two different non-miscible liquids, especially a conductive polar liquid, like water, and an insulating non-conductive liquid, like oil.

An 'interface area' separates the insulating, non-conductive liquid from the polar liquid.

A tuning voltage fed to control electrodes moves a 'surface area' that describes the border of the cell wall surface to the adjacent polar liquid. Changing the tuning voltage causes the changing of the surface area by adjusting the contact angle between the surface area and the cell walls. The contact angle is the angle at which a liquid interface area meets a solid surface. The solid surface is formed by the cell walls (in the liquid cell).

The term 'electro wetting effect' defines the change of said contact angle due to an applied potential difference between the solid and the polar liquid.

Recently liquid cells forming tunable optical elements are known from several publications. For instance, the published US-document no. US2006/079728, (Kuiper et al.) describes an apparatus for providing a fluid meniscus with variable configurations by means of electro wetting. The apparatus comprises a single fluid chamber that holds two different fluids separated by an interface area of which the edge, having different sides, is constrained by a closed set of adjacent cell walls of a fluid chamber. A first control electrode acts on a first side of the meniscus edge and a second control electrode acts separately on a second side of the meniscus edge. Selected meniscus configurations can be formed by providing different tuning voltages to both electrodes respectively.

The apparatus published in document US2006/079728 describes an optical apparatus that allows desirable fluid meniscus configurations, which are not rotationally symmetric about the optical axis of the apparatus. For example, configurations which are tilted and/or astigmatic about the optical axis may be provided. A range of fluid meniscus configurations can be formed in a variable, controllable manner. Exemplary meniscus configurations include flat shapes and anamorphic lens shapes capable of the precise refractive or reflective angular deflection of light in up to three dimensions. The meniscus configurations can be formed accurately and efficiently under the application of variable voltage patterns applied across the configuration of electrodes and a common steering electrode.

The document US2006/079728 does not disclose a device comprising millions of arrayed tunable optical micro cells that are individually addressable and controllable for tuning by electro wetting. Further, the document does not disclose how to manufacture this device avoiding a high effort of manufacturing technology.

An essential disadvantage of conventional liquid cell products such as a liquid Fresnel lens or planar cell array having long rectangular liquid cell is that it will not work well, because the long rectangular channel geometry of such prior art cannot support a stable and accurate tunable interface between the adjacent liquids.

Current research activities on the fields of imaging, displays, and communications have shown, there is a need for a flat optics comprising individually and continuously tunable liquid cells arranged in a matrix to enable a full implementing of the refractive power of classical 'glass' optics.

These flat optics are necessary, for instance, to realize automatic stereoscopic displaying of two different video images or for reconstructing holographical three-dimensional scenes at different places of an observer volume. An additional application of these flat optics can be used to steer laser beams for applications such as laser radar. Furthermore, such flat optics can be used to direct solar energy for lighting or electricity generation.

As described in the above-mentioned document electro wetting devices voltage-modulate the contact angle between a polar liquid and a dielectric to tune the interface area between two non-miscible liquids. The contact angle modulation can then be used to reconfigure, for instance, a saline meniscus geometry and therefore to chance the refraction angle or to chance the phase of light. Electro wetting devices modulate the contact angle between a saline liquid and a dielectric by a tuning voltage at control electrodes and corresponding counter electrodes. This contact angle modulation can then be used to reconfigure the interface area geometry between the adjacent different fluids and therefore to modulate incident light waves. Each cell of the flat optic device comprises cell wall electrodes being arranged essentially parallel directed to the optical axis of the optical array device. The optical axis of the array device and/or of a single liquid cell is oriented essentially perpendicular to the surface of the supporting substrate.

An optical flat array device having discrete tunable liquid cells can be used for multiple application of spatial light modulation; for instance to create, individual beam deflection functions in a light wave field or spatial light modulator means realizing phased-array function, when the incident light is coherent.

More details referring to the principle of electro wetting are described in the references:

L. Hou, N. Smith, and J. Heikenfeld, Electrowetting Modulation of Any Flat Optical Film, Appl. Phys. Lett., Vol. 90, 251114, 2007

J. Heikenfeld, N. Smith, D. Abeysinghe, A. J. Steckl, and J. W. Haus, Flat Electrowetting Optics, IEEE LEOS Newsletter, Vol. 20 (4), pp. 4-10, August 2006. and B. Sun, K. Zhou, Y. Lao, W. Cheng, and J. Heikenfeld, Scalable Fabrication of Electrowetting Pixel Arrays with Self-Assembled Oil Dosing, Appl. Phys. Lett., Vol. 91, 011106, 2007.

Furthermore, it is highly desirable to have a means for economic manufacturing and arraying millions of liquid cells having cross-sections of some ten micrometers to a stable array having a high density and a high light transfer. The liquid cells should be discretely controllable by electric signal means, like video signals or computer graphic means for displaying video content two or three dimensional or reconstructing moving three dimensional scenes by means of holographic technique. Prior art provides no means by which such large arrays of devices which can be manufactured at the cost and precision required for commercial holographic displays or wide-aperture laser radar.

Therefore, it is an object of the invention to provide and manufacture a tunable optical array device that comprises liquid cells realizing variable and spatial light beam steering of incident light, which continuously varies the optical characteristics of the interface area preferably with a lateral precision below one micro-meter.

According a further object of the invention the tunable optical array device should be useful in spatial light modulator means to realize spatial phase-shifting in transmitted portion light waves capable for temporal or spatial interference.

It is further an object of the invention to create a method that uses techniques to allow on-demand manufacturing of high-aspect-ratio cell structures with lateral precision below one micro-meter.

A further object of the invention is to reduce the tuning voltage to drive the control electrode system that tunes the interface areas in the liquid cells to voltages below 15V. That has the advantage that tuning and cell addressing circuitry can be used that is compatible to the conventional circuitry of Thin-Film-Transistor-Technology for easy adoption in the manufacturing process of Liquid Crystal Display devices using straight forward conventional photo resist and coating process technology.

A further object of the invention is to provide a manufacturing technology for a tunable optical array device comprising liquid cells that is useful for easy manufacturing high aspect ratio cells, having an improved aspect ratio and an extended fill factor to constitute efficient transfer of light into the desired directions.

As used herein, the term high aspect-ratio means: the walls separating the liquid cells of the array have a geometric structures that are much taller than wide and or thick. The same used technology should provide means for manufacturing both two-liquid or three-liquid cells easy to fill with liquids.

A further object of the invention according to an exemplary embodiment is to constitute a fast redirection and/or modulation of a complete light wave field fed by coherent light or modulated with holographic information to different outgoing directions more than some hundred changes per second, for instance in synchronization to a sequence of video frames for holographic reconstructing three-dimensional scenes by video holograms at different eye positions in an observer volume of a holographic reconstruction device.

SUMMARY OF THE INVENTION

Exemplary embodiments according to aspects of the present invention may satisfy one or more of the above-mentioned desirable features set forth above. Other features and advantages will become apparent from the detailed description which follows.

The tunable optical array device according the invention comprises at least one supporting substrate having at least a tunable optical component, and means for individually addressing liquid cells and varying the optical characteristics of the liquid cell. Both components are integrated to form a compound unit.

A tunable optical component comprises a plurality of individual tunable liquid cells regularly arranged and integrated to at least one cell structure forming an array on the supporting substrate. A single liquid cell comprises several integrated cell walls, the cell walls projecting away from the supporting substrate and having a closed base area and an open cell surface at the cell wall edges. The liquid cell is filled with at least two liquids or fluids to provide at least one tunable interface area for varying the optical characteristic of the liquid cell.

The means for individual addressing of the liquid cells and varying the optical characteristics, which are combined with the optical component, comprise the following components:

a control electrode system having a plurality of individual addressable cell wall electrodes and at least a counter electrode assigned to each liquid cell for two-dimensionally tuning the contact angle and/or position of the interface areas in relation to the cell walls;

an electronic tuning circuitry means assigned to control electrode system; and a cell addressing means connected with the electronic tuning circuitry means of the control electrode system for separate tuning the interface areas.

Advantageously, a multitude of integrated cavities or penetrations are arranged in a cell substrate to provide the cell structure, wherein a portion of the supporting substrate directly forms the cell substrate. Alternatively, an additional substrate coated on the supporting substrate forms the cell substrate.

According to a preferred embodiment of the present invention the integrated cavities or penetrations are formed by removing substance of the cell substrate having a frustum shape. This allows to utilize standard lithographic processes, methods of manufacturing integrated semiconductor products and techniques for liquid cell display manufacturing and consequently a cost-effective and high-precision manufacturing of tunable optical array devices having structures with some millions of liquid cells these are stable arranged to a compound device.

Referring to a specific embodiment of the invention a single compound unit is formed by a multi layer structure comprising different substances. In such device a single cell layer is utilized to manufacture a single cell structure. That means, one or more layers provide the optical component(s) and additional layers having different substances are utilized for manufacturing the means for individual addressing and tuning the optical characteristics of the optical component(s). This has the advantage that the substances of the compounded layers can be adapted for its function and manufacturing technology.

The additional layers can comprise one or more interconnecting access layer means for connecting cell wall electrodes, which are arranged in the cell layer, to the electronic tuning circuitry means, or cell addressing means within one layer or between different layers.

Advantageously the additional layers can be coated between the supporting substrate and the cell layer. Especially the components of the electronic tuning circuitry means and/or the cell addressing means can be at least partially—preferably completely—positioned on the supporting substrate where cell walls are located. The electronic tuning circuitry means and/or the cell addressing means can be integrated into the bottom of the cell wall structure. This enables a high throughput of light passing through the device.

According to the basic principle of electro wetting using liquid cells, the cell wall electrodes are arranged essentially parallel directed to the cell wall surfaces. Therefore, the cell wall electrodes are manufactured using a specific additional coating process.

In a further additional process, interconnecting access means directed essentially parallel to the optical axis are manufactured for connecting the cell wall electrodes located in the cell layer with the additional layers comprising the means for individually addressing the liquid and tuning the optical characteristics.

In order to create a tunable optical array device operable for realizing complex optical functions or a function having an extended operating parameters, for instance, an extended deflection angle to deflect light beams, an advantageous embodiment of the invention comprises at least two supporting substrates, which have complementary structures of a control means and complementary liquid cell structures, stacked to a sandwich forming a single tunable optical array device.

According a preferred embodiment, the supporting substrates are stacked open cell surface on open cell surface, such that cavities or penetrations of a first component structure combined with corresponding cavities or penetrations of the second component structure form a corresponding number of combined liquid cells having the double amount of the aspect ratio of the cell walls to the cell base area.

BRIEF DESCRIPTION OF THE DRAWINGS

The drawings of this patent application illustrate exemplary embodiments of a tunable optical array device and together with the description, serve to explain certain principles.

The drawings illustrate in detail several embodiments of the invention comprising design structures these are different complex designed for convenient manufacturing and operable in different implemented optical applications. All drawings showing exemplary a cross section through a small number of liquid cells of a complete cell structure only. A compound unit according the invention can comprise up to some millions cells. Furthermore, all drawings illustrate exemplary the arrangement of the components, however not the correct geometrical proportions.

DETAILED DESCRIPTION

In the following part of description the invention will be described in connection with certain embodiments. The detailed description of the invention is intended to cover all alternatives, arrangements as may be included within the spirit and scope of the invention as defined by the appended claims. In particular, those skilled in the art will recognize that the components of the tunable optical flat array device described herein could be arranged in multiple different ways.

Figure 1:
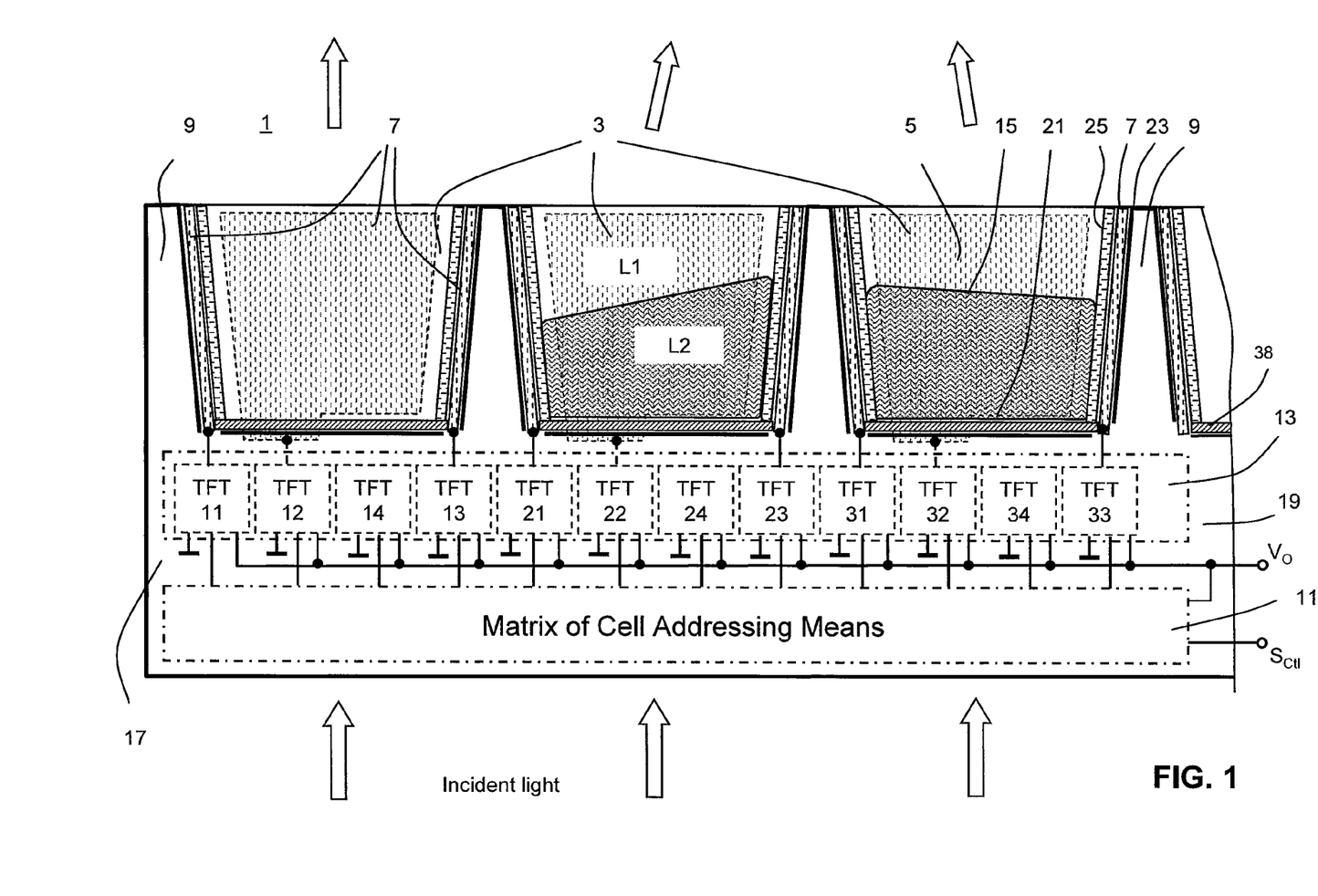
FIG. 1 shows a cross section of a basic embodiment of a tunable optical array device according to the invention using a simple design comprising a single compound unit, wherein a small portion of the optical array with a small number of liquid cells is depicted only.

FIG. 1 illustrates a primary embodiment of the present invention involving a tunable optical array device 1 comprising a cell structure 3 of the regularly arranged liquid cells 5, the liquid cells 5 being tunable by a control electrode system of individual addressable cell wall electrodes 7 located at the cell walls 9. A cell addressing means 11 for addressing the cell wall electrodes 7 is connected with an electronic tuning circuitry means 13 that provides a control voltage to the assigned cell wall electrodes 7 for individual tuning the optical characteristics of the liquid cells 5. The tuning of the optical characteristics occurs by changing the electro wetting power of the liquid cells 5 to move an interface area 15 between two non-miscible liquids L1 and L2. All components: the cell structure 3, the cell wall electrodes 7, the electronic tuning circuitry means 13, and the cell addressing means 11 form a single compound unit 19. The first liquid cell in FIG. 1 was sketched without liquids for better illustration the shape and location of the cell wall electrodes 7 located in the cell walls 9.

The compound unit 19 is tunable by providing control voltage to the cell wall electrodes 7 and at least one counter electrode per liquid cells 5. The location of the counter electrode is not shown in the figures because the location depends on the position of the non-miscible liquids L1 and L2 in the liquid cells 5. The counter electrode is designed and arranged such to be in electrical contact with a conductive polar liquid.

A Signal Sctl can alter the geometry of the interface areas 15 to steer the electromagnetic wave propagation through the cell structures by the effect of refraction, reflection, or diffraction.

The liquid cells of the cell structure 3 are tightly packed and form an extended flat optical device that can be individually controlled as desired. Alternatively or additionally to the optical modulation function of spatial light deflection steering the optical device can be used as an optical spatial phase modulator as well, with one or more $2\pi$ phase settings between adjacent cells. In other words, the optical device can be used as a spatial wave front modulation means if collimated light is passing the element.

The substance of supporting substrate 17 is transparent, like glass or synthetics to enable a maximum throughput of modulated light through the optical array device 1 during operating.

Alternatively a plate of semiconductor substance having penetrations for the cell structure is used for the supporting substrate. At least a glass plates or synthetics plates 24 encapsulate the cell surface of the cells structures 3.

In a basic embodiment of the present invention the liquid cells 5 contain two liquids, a conductive polar liquid L1 such as water and an insulating non-conductive liquid L2, such as silicone oil. Both liquids should have a high difference of index of refraction, for instance 1.6 (oil) to 1.34 (salt water) to provide a high light modulation index or deflection angle when the device operates in a deflecting function.

The liquids L1 and L2 of the claimed cell structure 3 are also covered by a closed set of cell walls 9 forming a cell body, such that the cell walls 9 projecting away from the supporting substrate 17. The cell structure 3 could be covered by a transparent plate 24 (shown in FIG. 3).

However, in contrast to conventional liquid cell devices, where a cylindrical body or cell walls arranged to a right prism form the cell body, the cell walls 9 according the inventive device 1 form a frustum.

In a preferred embodiment of the invention, the frustum is configured such that a small section of the supporting substrate 17 provides a cell base area 21 and the cell walls 9 are not perfectly vertically arranged on the supporting substrate 17. The cell walls 9 are arranged projecting away from the supporting substrate such that the small section of the supporting substrate 17 closes the liquid cell 5 at one edge of body only. The cell walls 9 are slanted arranged on the supporting substrate 17 such that the open edge of body 23 has a cross section enlarging in relation to the closed cell base area 21. That means the cross section of the liquid cell 5 is a smaller at the closed cell base area than the cross section at the open cell edges 23. In this embodiment the small section of the supporting substrate 17 forms the cell base area 21 directly.

This cell form has the advantage that the frustum shape liquid cells 5 can be arrayed with maximum fill factor, and the cells are highly agile to be tunable in at least two dimensions, whereas each liquid cell has to be tunable between different settings more than some hundred times per second.

According to an advantageous feature of the invention integrated cavities or penetrations are arranged in a cell substrate plate in order to form the cell structure 3, wherein the supporting substrate 17 or an additional substrate, like a sealing substrate or an isolating layer, provides the cell substrate plate.

A lithographic method comprising photo resist patterning followed by a lift-off process removes substrate matter from the cell substrate, for instance, the supporting substrate 17, to manufacture the integrated cavities or penetrations forming the cell structure 3.

Such lift-off process is a simple and convenient method for patterning films that are deposited on the supporting substrate. A layout pattern defining the cell structure is coated on a substrate using photo resist. A film is blanket-deposited all over the substrate, covering the photo resist and areas in which the photo resist has been cleared. During the following lifting-off, the photo resist under the film is removed with solvent, taking the film with it, and leaving only the film which was deposited directly on the substrate. Such methods are commonly used in semiconductor manufacturing. Exemplary photoresist materials include the Type Microchem SU-8 or KMPR negative-acting resist formulations.

Each liquid cell 5 is tunable by a control electrode system of individual addressable cell wall electrodes 7. For a two-dimensional moving the interface area 15 between different set-ups each liquid cell of the cell structure 3 should comprise at least three cell wall electrodes.

A cell structure having a triangular cell body reduces the number of individual addressable cell wall electrodes significantly. However, a triangular base area of a liquid cell causes a reduced cross section also, consequently a reduced aspect ratio of the cell walls to the cell base area and a reduced ratio of wall distance to cell wall width. Both ratios reduce the optical performance of the optical, like deflection angle a light output in a spatial light modulator operation.

Therefore, the best mode of invention uses a cell structure, wherein the base area of the cells forms a rectangle, especially a square containing at least four cell wall electrodes 7.

The control electrode system of individual addressable cell wall electrodes 7 allows controlling the contact angle of the polar liquid by a control voltage. A requirement of the basic principle of electro wetting using liquid cells comprises all cell wall electrodes 7 having to be insulated from the polar liquid L1. In order to allow a continuous tuning of the optical characteristics by moving the interface areas of the liquid cells at a high modulation ratio, the cell wall electrodes 7 should span about the full length of the assigned liquid cell. Further, the cell wall electrodes 7 should be designed such that a low control voltage can provide a high electric steering field.

To achieve that, according a preferred embodiment of the invention, the cell wall electrodes 7 are separately located conductive thin films coated on the inner surface of a corresponding cell wall.

A specific deposition process deposes a thin film forming a pattern of an electric conductive substance on the cell wall surface to form the cell wall electrodes 7 such that cell walls located between adjacent liquid cells providing two cell wall electrodes insulated each to other, individually controllable, and adjoining to the liquids L1 and L2 of the assigned liquid cell.

The utilized electric conductive substance should be transparent relating the operation wave length of the used light and should have a low sheet resistance.

Several substrates are available for the deposition process, for instance, indium tin oxide (ITO, or tin-doped indium oxide) know from the manufacturing of LCD-devices that is a mixture of indium (III) oxide ($In_2O_3$) and tin (IV) oxide ($SnO_2$). Indium tin oxide is a substance being electrical conductive and optical transparent.

Alternatively, other electric conductive substance, like aluminum-doped zinc oxide can be used for deposing the electric conductive pattern of cell wall electrodes 7.

Alternatively, if the electrodes 7 are spatially arranged such that they do not largely interact with the propagating light, then the electrodes 7 may comprise a standard metal such as Aluminum.

A high electric steering field can be achieved through a second deposition process. This process coats a thin electrically isolating film 25 on the surfaces of the cell wall electrodes 7.

Advantageously, the thin isolating film 25 coated on the electrode surface is a hydrophobic dielectric, such as Alumina covered by amorphous Fluoropolymer having a high resistance to solvents, acids, and bases, like DuPont amorphous Teflon® or Asahi Cytop.

For easy manufacturing of the cell structure filled with liquids, advantageously, a portion of the liquid cell comprises a hydrophilic coating attracting the polar liquid during moving of the compound unit 19. In FIG. 1 is the cell base area 21 coated by a hydrophilic coating 38, when liquid L2 is water.

Figure 2A:
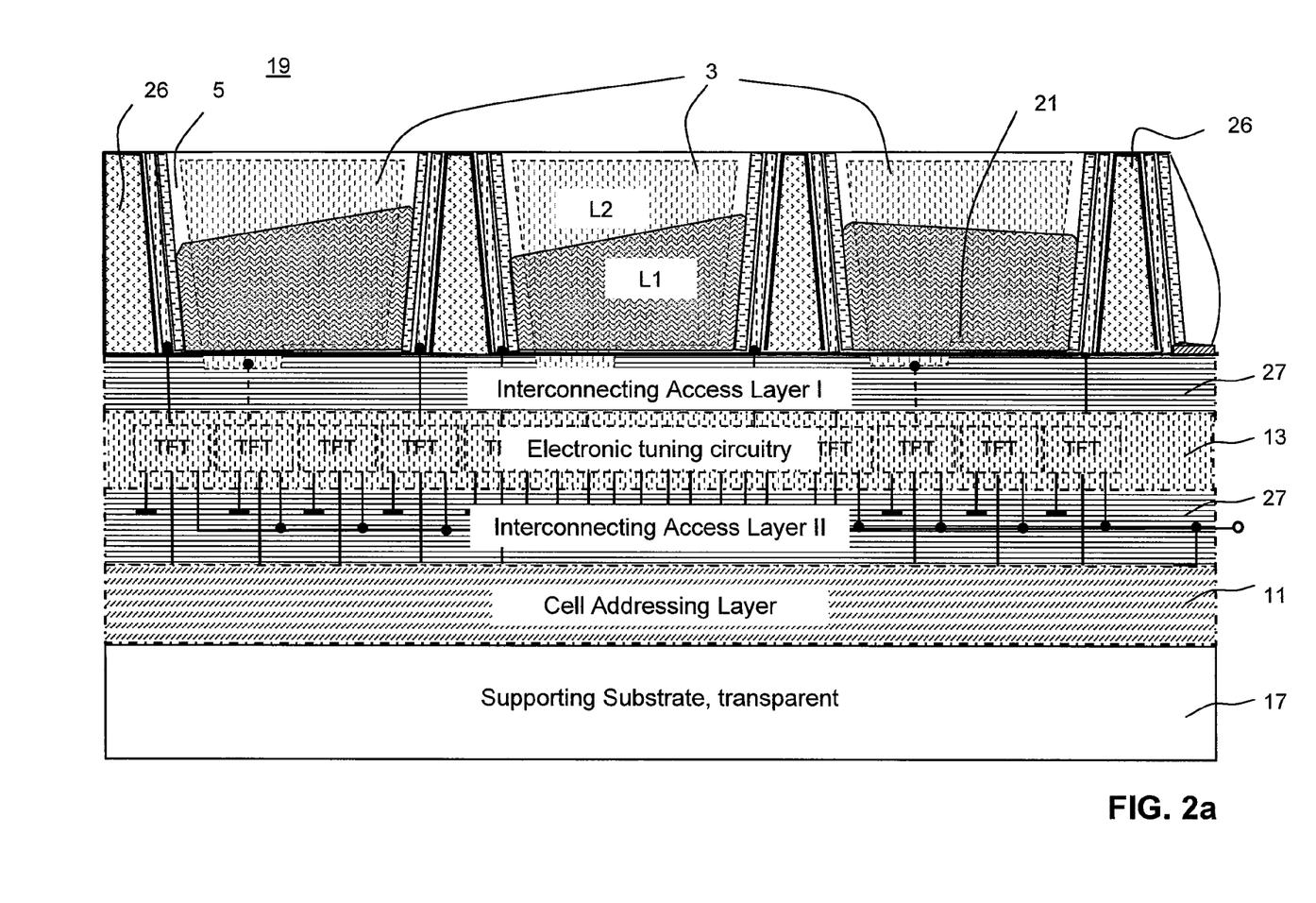
FIG. 2a, and FIG. 2b, show an extended embodiment of an optical array device according to the invention illustrating a single compound unit comprising a multilayer structure having one cell layer with a structure of liquid cells.

FIG. 2a, illustrates an extended embodiment of an optical array device according to the invention. The cell structure 3 is similar frustum shaped like the first embodiment; however a single compound unit 19 is formed by a multi layer structure comprising different substances.

The compound unit 19 comprises a cell layer 26 having a multitude of integrated cavities or penetrations forming the liquid cells 5 of the integrated cell structure 3. The cell layer 26 is manufactured by partially removing layer substance from the layer plate in a lift-up process according a lithographic pattern.

Additionally, on the supporting substrate 17 one or more additional layers are coated to provide specific substances like semiconductor substance, insulating substance, or conducting substance in order to manufacture the electronic tuning circuitry means 13, the cell addressing means 11 connected with the electronic tuning circuitry means 13, or interconnecting access means 27 for connecting all electrical components, 11 and 13 including the cell wall electrodes 7. These additional layers are located between the supporting substrate 17 and the cell structure 3.

In this embodiment of the invention the layer 27 being coated as the last on the supporting substrate 17 closes the cell base areas 21 of the cell structure 3.

The electronic tuning circuitry means 13 comprise at least one thin-film-transistor TFT connected with at least a cell wall electrode for providing a control voltage to the assigned cell wall electrode. This technology is known from the manufacturing conventional LC-Displays and deposes, for instance, a thin film of a semiconductor active layer as well as a dielectric layer and metallic contacts over a supporting substrate, like glass to form a special kind of field effect transistor.

Advantageously the thin-film-transistor is located on a cell wall or adjacent to a cell wall on the supporting substrate.

Multiple combinations of manufacturing a supporting substrate using a multi layer structure for the cell structure and for the cell addressing and tuning can be utilized to implement this invention.

According a further embodiment of the invention, the supporting substrate forms the cell substrate directly and additional layers having different substances provide addressing and tuning means. In an alternative embodiment an additional substrate arranged on the supporting substrate can be utilized to form the cell substrate for the integrated cell structure.

In contrast to conventional liquid cells the frustum shaped cell walls according the invention enable the use of standard lithographic processes and methods of manufacturing integrated circuits for manufacturing the cell wall electrodes. The structure of frustum shaped liquid cells enables a manufacturing the cell wall electrodes in specific additional coating process after manufacturing the cell structure.

To enable light propagation completely through the assigned liquid cells the integrated cavities penetrate both the cell layer and the layers having the control means, which allow control electrode system addressing and interface area tuning, to a transparent supporting substrate that forms the closed cell base area.

Figure 2B:
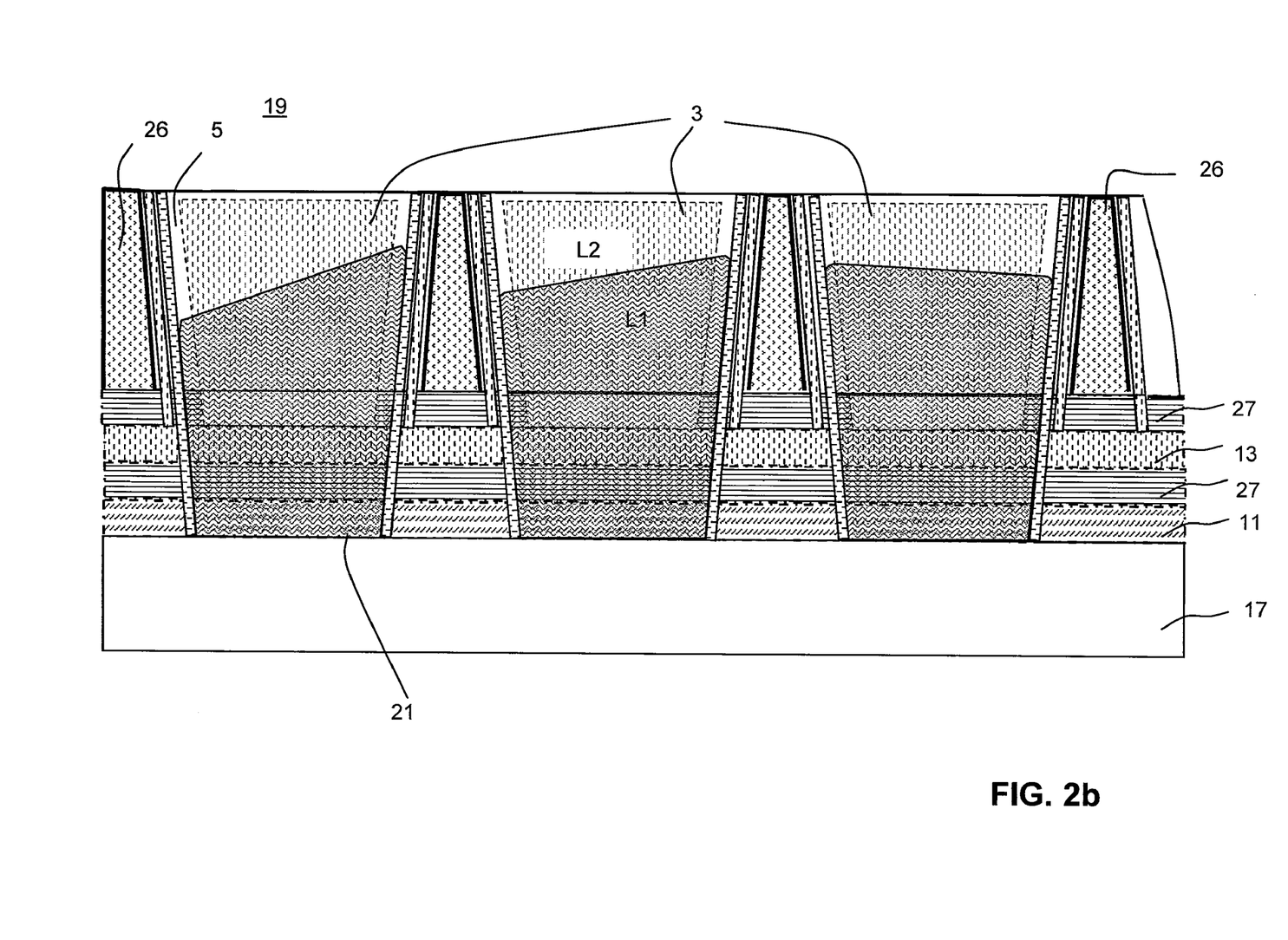

In contrast to FIG. 2a, wherein the layers 11, 13, 27 and the supporting substrate 17 have to be transparent referring to the used electro magnetic wavelength; FIG. 2b, shows an embodiment where the layers have penetrations instead of cavities and the electrical components in the layers 11, 13, and 27 are located such that the electrical components do not influence the incident light propagation.

In this embodiment the transparent supporting substrate forms the closed cell base areas 21.

Figure 3:
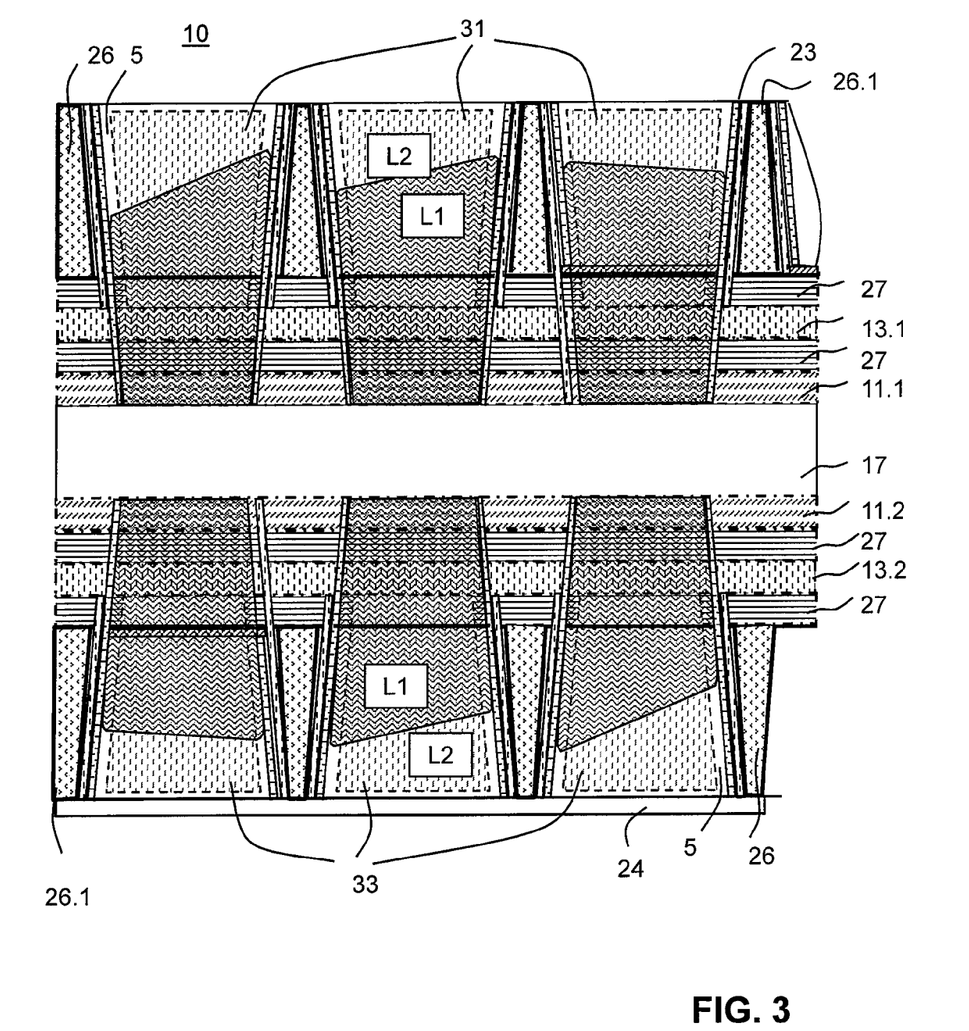
FIG. 3 shows a further extended embodiment of an optical array device according to the invention illustrating a compound unit comprising a multilayer structure also, but two cell layers have individual controllable cell structures are arranged opposite projecting away from a common supporting substrate.

FIG. 3 illustrates a further extended embodiment of an optical array device 10 according to the invention illustrating a compound unit comprising a multilayer structure also but two cell layers having individual controllable cell structures, the cell structures being arranged on opposite sides of and projecting away from the common supporting substrate 17.

According to this embodiment of invention the device 10 includes at least one common supporting substrate 17 having two cell structures 31 and 33 providing open cell surfaces and being manufactured on opposed substrate surfaces of the same supporting substrate 17 such that the two cell structures 31 and 33 are stacked cell base area to cell base area. Further, the device has additional layers providing the cell addressing means 11.1, 11.2 and the electronic tuning circuitry means 13.1, 13.2 for moving the interface areas of both cell structures 31 and 33.

In FIG. 3 the additional layers provide the cell addressing means 11.1, 11.2, and the electronic tuning circuitry means 13.1, 13.2 being located between both cell structures 31 and 33 and the corresponding substrate surfaces of the common supporting substrate 17.

Alternatively, these additional layers can be located on the cell surfaces 23 of each cell structures 31 and 33 to close the cell chambers. The additional layers can have penetrations corresponding with the cell structures 31 and 33 and closed by a transparent substrate plate 24.

Figure 4:
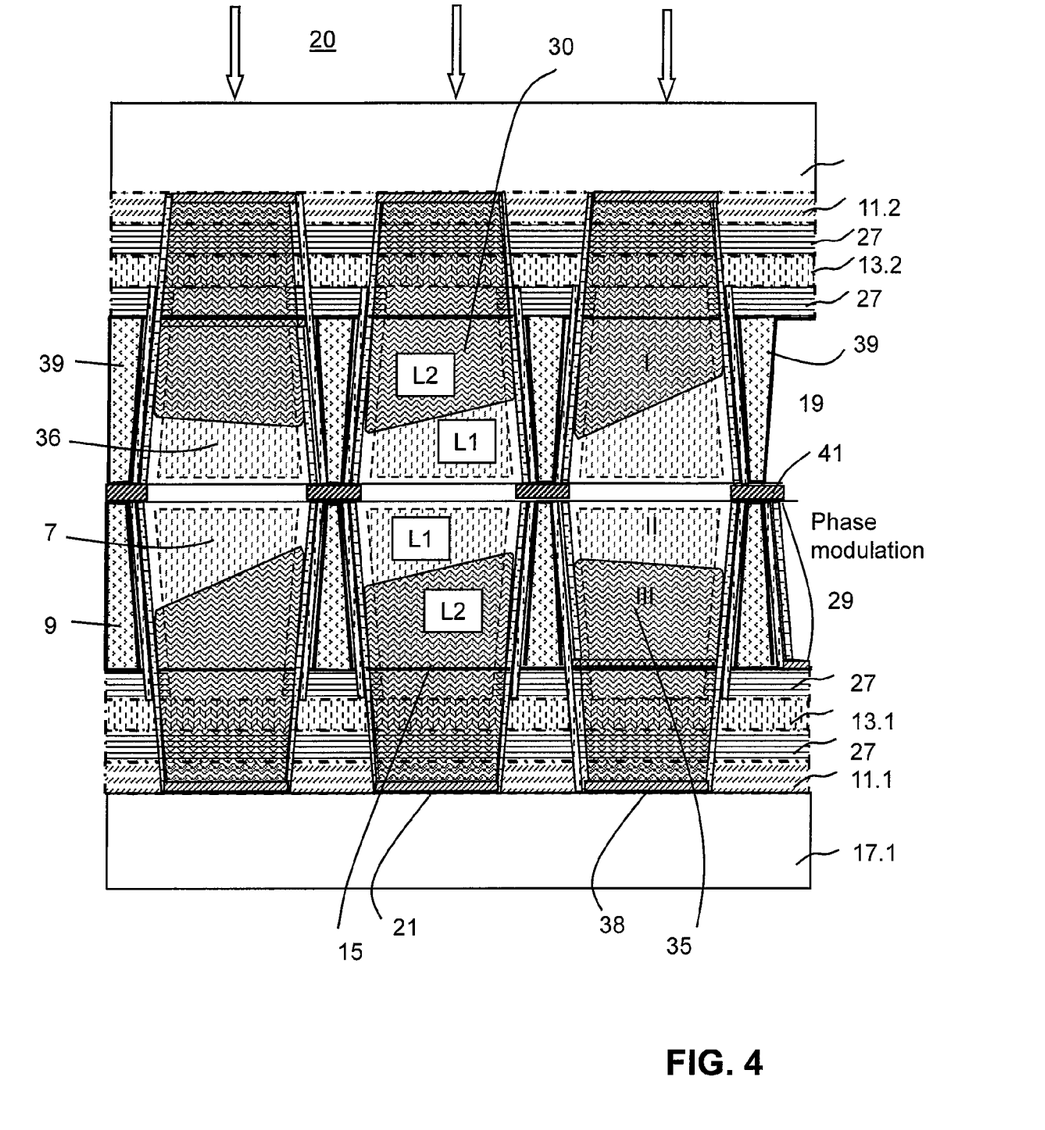
FIG. 4 shows a further extended embodiment of an optical array device according to the invention comprising two supporting substrates, which have complementary structures of a control means and complementary liquid cell structures, stacked to a sandwich forming a single tunable optical array device

FIG. 4 illustrates a tunable optical array device operable for implementing complex optical functions or function having extended operating parameters, for instance, an extended deflection angle to deflect light beams. The device comprises two complementary compound units 19 and 29 each is manufactured using separate supporting substrates 17.2 and 17.1. The compound units 19 and 29 have complementary structures of a control means and complementary liquid cell structures, wherein each liquid cell structure has an own cell surfaces opposite to the cell base areas. Both discrete manufactured complementary compound units 19 and 29 are stacked to a sandwich forming a single tunable optical array device 20.

According to an particularly advantageous embodiment of the invention, the area of the cell base is sealed by a hydrophilic coating 38 that attracts the polar liquid for easy dosing the liquid cells during manufacturing.

In a preferred embodiment of the invention the stacked complementary compound units 19 and 29 are stacked open cell surface on open cell surface, such that cavities of compound unit 19 are combined with corresponding cavities of compound unit 29 form a corresponding number of combined liquid cells 35 having two cell volume portions providing the double amount of the aspect ratio of the cell walls to the cell base area.

The optical flat array device 20 can be used to implement tunable liquid cells 35. The tunable liquid cells 35 cover three individually tunable regions I, II, III, filled with portions of at least two non-miscible liquids or fluids L1 and L2 to provide a first and a second interface area 15 and 30 that is individually moveable by a second set of cell wall electrodes 36 located in-line to the first addressable cell wall electrodes 7 at surrounding stacked cell walls 9 and 39.

In this embodiment non-conductive liquid L2 should be located in the center location and the polar liquid L1 being located to be in contact with the cell base area 21. Advantageous, the area of the cell base comprises a hydrophilic coating 38 attracting the polar liquid during mounting both complementary compound units 19 and 29 to one optical array device.

Advantageously, a spacer layer 41 is arranged between both stacked compound units 19 and 29. To avoid interactions between both control electrode systems the spacer layer should have an electrically insulating substance.

According a further advantage the spacer layer comprises channels for balancing the fluid levels between neighboring liquid cells during mounting both compound units 19 and 29 or during operation of the optical array device 20.

For the device of FIG. 4 a preferred embodiment has liquid L2 as the high refraction index liquid and liquid L1 as the low refraction index liquid. At large light deflection angles, this particular arrangement maximizes the efficiency of light transfer through the device. Furthermore, a preferred embodiment has the liquid L1 as an aqueous solution containing at least a salt or surfactant component. This salt or surfactant component can enhance the electrowetting response of the liquid. Furthermore, because a salt is unable to easily permeate through a non-conductive liquid L2, the volume of the polar liquids L1 at the top and bottom of the device is preserved through osmotic forces. It should be noted that it might be desirable to have the liquid L2 as the low index liquid and L1 as the high index liquid.

According a further preferred embodiment, one TFT can control multiple similar cell walls in multiple cells.

An application of the optical array that is used for modulation of image displaying or reconstruction, four or eight TFTs are used to control all four walls, but a group of 10×10 cells could be controlled by the same set of TFTs in other applications.

The tunable optical array device is operable in several applications:

In a first embodiment the electronic tuning circuitry means drives the cell wall electrodes by different control voltages to move the (flat shaped) interface area tilt angle of the assigned liquid cell two-dimensionally—i.e. in two independent directions—to provide spatially individually tunable prism functions for spatial light bundle steering.

In a second embodiment the electronic tuning circuitry means drives the cell wall electrodes by different control voltages to move the interface area position to realize individually tunable phase modulator cells in a spatial light modulator. In other words the interface area position is altered such that the optical path length of the light passing through the liquid cell is altered.

Figure 5:
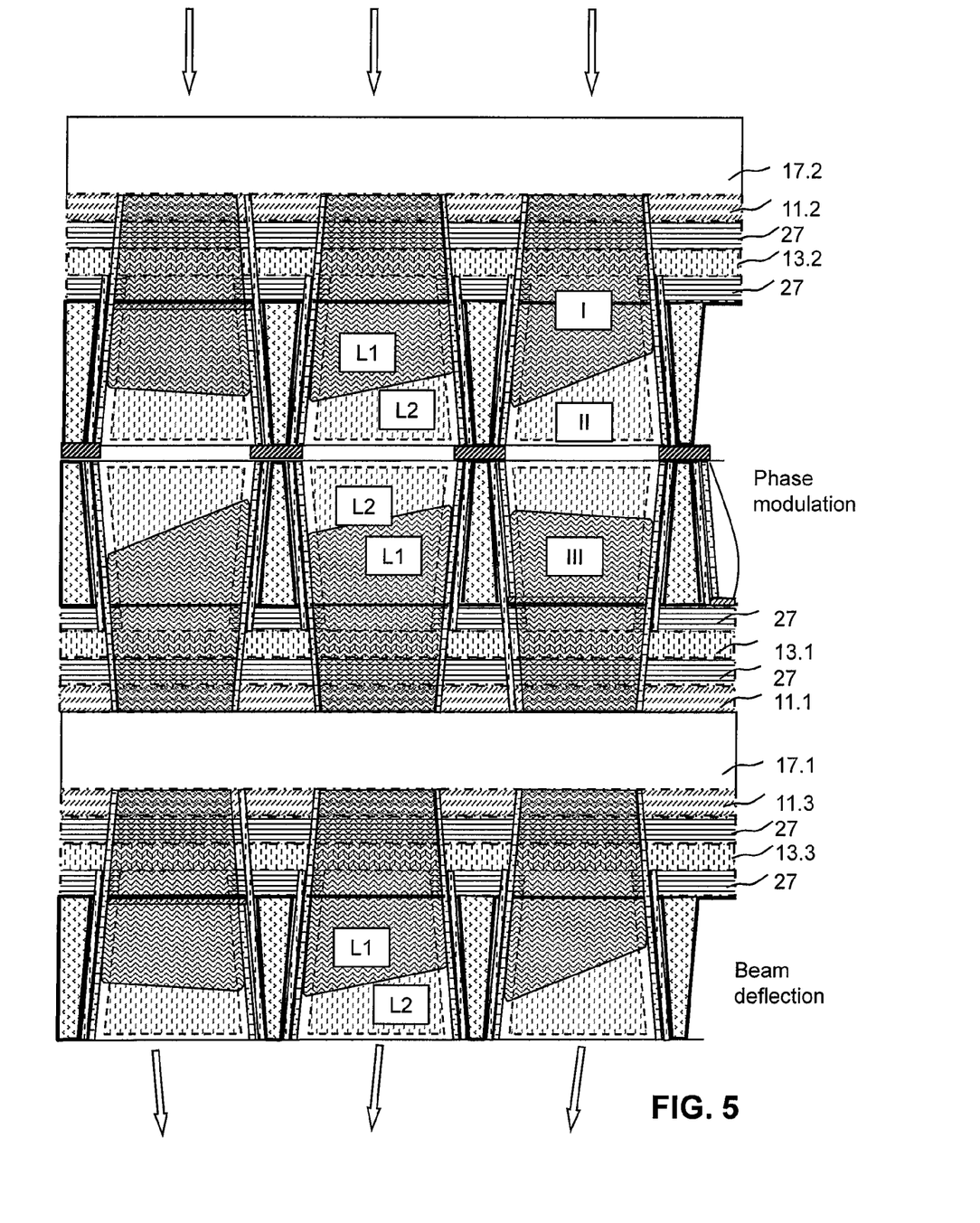
FIG. 5 shows a further extended embodiment of an optical array device according to the invention comprising two supporting substrates, the two supporting substrates having three cell structures to execute different optical tasks.

FIG. 5 shows a further extended embodiment of an optical array device according to the invention comprising two supporting substrates 17.1 and 17.2, these have three cell structures. The upper two cell structures execute a first optical task. The lower cell structure executes a second optical task. The upper unit is designed similar to FIG. 4 to realize the function of a spatial light modulator modulating spatially the phase or optical pathlength in a wave field of coherent light. A second unit—shown in FIG. 5 on the bottom—is designed similar to FIG. 3. This unit moves or alters the propagation direction of the modulated wave field and therefore deflects the light beams passing through this unit. The incident light beams propagating towards the device as shown in FIG. 5 are indicated by the arrows shown in the upper part of FIG. 5. The light beams which passed through the device are shown in the lower part of FIG. 5. These light beams are deflected depending on the orientation of the interface areas of the second unit.

The tunable optical array device according the invention can be manufactured in a process comprising the following steps of:

forming an electronic tuning circuitry means on a supporting substrate plate;

forming an electrical insulator covering the tuning circuitry means;

forming an interconnecting access means through the electrical insulator to interconnect at least a counter electrode to each liquid cell and to the cell wall electrodes;

forming integrated cavities or penetrations each having several cell walls that define individual tunable liquids cells of the liquid cell structure;

coating a conductive material pattern on cell wall surfaces of a plurality of cell walls forming cell wall electrodes, which at least partially cover the cell wall surfaces and are connected with the tuning circuitry means through the interconnecting access means;

covering the cell wall electrodes with a insulator coating that is advantageously a hydrophobic dielectric for better optical performance;

dosing at least two non-miscible liquids or fluids into the cavities defining the liquid cells, Advantageously, an insulating liquid only occupies a portion of the volume of each cavity and a polar liquid covers the insulating non-conductive liquid.

If the difference in refractive index between the liquids L1 and L2 is high enough (e.g., when the n of water is approximately 1.33 and the n of oil is approximately 1.45), then the tunable optical device according the invention can achieve a deflecting of light up to +/−60° relative to the light beams passing through the optical array device without deflection. Such an optical array device can be used for light beam steering. This allows a convenient wave tracking in auto stereoscopic displaying systems or holographic reconstruction systems.

Alternatively, the invention can provide a device that modulates light for a beam steering in an extended deflection volume or phase modulation full to full $2\pi$ cycles at any angle. Such a device of the present invention can advantageously be used in devices as they are disclosed for example in the German patent applications DE 10 2008 000 438.3 (filing date: 28 Feb. 2008) or DE 10 2007 024 237.0 (filing date: 21 May 2007).

By using the sandwich architecture according to the embodiment shown in FIG. 3 or FIG. 4 it is easily possible to create a sandwich arrangement of liquid cells having an extended aspect ratio in relation to conventionally liquid cells: An extended aspect ratio of 5:1 is achievable with a fill factor >75%. Aspect ratios for cell walls can also exceed 20:1 for fill factors exceeding 90%.

An optical array device utilized for holographic reconstruction systems has to implement a complex of different light modulation, like spatial phase shifting and beam deflecting. It is a significant advantage of composing sandwich arrangement of liquid cells to a flat compound device implementing such different light modulation with high precision on short optical paths.

Well known technologies for manufacturing electronic tuning circuitry means having thin-film-transistor circuitries can be used to providing a control voltage to the assigned cell wall electrodes.

Existing technologies on field of active Liquid Cell Display and Thin-Film-Transistor manufacturing provides simple and efficient solution and can be utilized for manufacturing the individual addressing and tuning means for tuning the cell structure.

According the invention a droplet can be positioned in a liquid cell by means of a combination of a hydrophobic layer and an adjacent hydrophilic layer coated on the cell walls.

The manufacturing method according the invention allows a self assembly process for filling both two liquids or three liquid into the cell arrays using a combination of capillary forces and chemical/physical effects like change of volume by temperature variation.

In order to create a tunable optical array device operable for realizing complex optical functions or function having an extended operating parameters it is easily possible to combine a chain of individually tunable cell structures wherein the cell walls are exact congruent aligned.

The object according the invention allows manufacturing a flat optical array device, and then when the device is completed, testing it for optical and electrical non idealities or undesired deviations.

These non-idealities can then be compensated for by computer software, algorithms, and feedback control loops well known by those skilled in the art of the fields of electronics and liquid crystal displays. Several innovations in device structure and manufacturing process are required to accomplish this aim, and are included as aspects of the present invention. The features described herein are therefore critical to successfully create large area flat optical devices using electro wetting. It should be further noted that the present invention captures a wide variety of other applications such as displaying devices displaying two- or three-dimensional image including retro-reflective panels and image projection devises or holographic projection reconstructing equipment reconstructing scenes three-dimensional.

The terms liquid and fluid are used throughout this document. For the sake of clarity, it is noted and understood that a fluid can be a liquid or a gas. In general, a fluid is a subset of the phases of matter and include liquid, gas, plasma and, to some extent, plastic solid.

While the invention has been illustrated by a description of various embodiments and while these embodiments have been described in considerable details, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicants' general inventive concept.

Several claims are made to better describe aspects of the present invention related to general structure and fabrication methods. These claims do not represent a limiting set and all inventive concepts contained herein involving arrayed liquid prisms are claimed under the present invention.

The invention claimed is:

1. A tunable optical array device arranged on at least one supporting substrate to form a compound unit comprising:
   a cell structure of regularly arranged liquid cells having a cell surface, wherein a single liquid cell comprises several cell walls projecting away from the supporting substrate, being closed by a cell base area, and filled with at least two non-miscible liquids or fluids to provide at least one tunable interface area;
   a control electrode system comprising a plurality of individual addressable cell wall electrodes and at least a counter electrode assigned to each tunable liquid cell for two-dimensionally contact angle tuning and/or interface area position tuning in relation to the cell walls and wherein the cell wall electrodes are conducting layers separately located and coated on a cell wall surface side and isolated to a liquid by an additional isolating coating;
   an electronic tuning circuitry means assigned to the control electrode system; and
   a cell addressing means connected with the electronic tuning circuitry means of the control electrode system for separately moving the interface areas.

2. The device of claim 1, wherein the supporting substrate is a transparent surface plate.

3. The device of claim 1, wherein integrated cavities or penetrations arranged in a cell substrate plate form the cell structure, wherein the supporting substrate or an additional substrate can be utilized as cell substrate plate.

4. The device of claim 3, wherein the integrated cavities or penetrations are formed by removing substrate matter from the cell substrate plate.

5. The device of claim 3, characterized by frustum shaped integrated cavities or penetrations to allow a lithographic manufacturing.

6. The device of claim 1, wherein the compound unit comprises a multi layer structure having layers of different substances for the cell structure and for means for individual addressing the cell structure and tuning the optical characteristics.

7. The device of claim 6, wherein the multi layer structure has a cell layer comprising integrated cavities or penetrations for cells, the cavities or penetrations forming the cell walls of the cell structure.

8. The device of claim 7, wherein the integrated cavities or cell penetrations are formed by removing matter from the cell layer.

9. The device of claim 7, wherein the integrated cavities or penetrations penetrate both the cell layer and the layers having the means for individual addressing the liquid cells and tuning the optical characteristics of the cell structure, at least partially, to a transparent supporting substrate that forms the closed cell base area.

10. The device of claim 1, characterized by an aspect ratio of the cell walls to the cell base area greater than 5:1.

11. The device of claim 1, characterized by a ratio of cell wall distance between two opposing cell walls of a cell to cell wall width greater than 5:1.

12. The device of claim 1, characterized by cell wall electrodes being connected with at least one thin-film-transistor providing a control voltage to the assigned cell wall electrode.

13. The device of claim 12, wherein the thin-film-transistor is located on a cell wall or adjacent to a cell wall on the supporting substrate.

14. The device of claim 1, comprising at least two supporting substrates forming compound units, which have complementary structures of a control means and complementary liquid cell structures, stacked to a sandwich forming a single tunable optical array device.

15. The device of claim 14, additionally comprising a spacer layer between both stacked compound units.

16. The device of claim 15, wherein the spacer layer between both stacked compound units is electrically insulating.

17. The device of claim 15, wherein the spacer layer between both stacked compound units provides channels for balancing the fluid levels between neighboring liquid cells or for providing a fluid connection between neighboring liquid cells.

18. The device of claim 14, characterized by compound units stacked cell surface on cell surface, such that cavities or penetrations of a first component structure combined with corresponding cavities or penetrations of the second component structure form a corresponding number of combined liquid cells having a higher aspect ratio of the cell walls to the cell base area.

19. The device of claim 18, wherein a combined liquid cell includes at least three liquid portions providing at least two interface areas individually tunable by several in-line cell wall electrodes, the in-line cell wall electrodes being located at surrounding cell walls.

20. The device of claim 1, wherein at least one supporting substrate has two cell structures being manufactured on opposed surfaces of the same supporting substrate such that the two cell structures are stacked cell base areas on cell base areas.

21. The device of claim 20, wherein different layers providing control means, which allow control electrode system addressing and interface area tuning, being arranged between the cell structures.

22. The device of claim 1, wherein the cell wall electrodes are fed by different control voltages and are arranged to tune the interface area tilt angle of the assigned liquid cell two-dimensionally to provide spatially individually tunable prism functions for spatial light bundle steering.

23. The device of claim 1, wherein the cell wall electrodes are fed by different control voltages and are arranged to change the interface area position to realize individually tunable phase modulator cells in a spatial light modulator.

24. The device of claim 1, characterized by a conductive polar liquid and a non-conductive liquid, wherein the conductive polar liquid is electrically connected to at least one counter electrode.

25. The device of claim 24 wherein the area of the cell base or a part of the cell wall electrodes comprises at least partially a hydrophilic coating attracting the polar liquid.

26. The device of claim 24, characterized by cell wall electrodes being coated by a hydrophobic dielectric coating and the cell wall electrodes being located relative to the polar liquid such that a hydrophilic dielectric coating holds the polar liquid to a defined region of the liquid cell, wherein the hydrophobic dielectric layer insulates electrically the polar liquid from the cell wall electrodes.

27. The device of claim 1 including an optically reflective film.

28. The device of claim 27 wherein the reflective film is a coating layer of a supporting substrate.

* * * * *